(12) United States Patent
Bhagwan et al.

(10) Patent No.: US 7,701,944 B2
(45) Date of Patent: Apr. 20, 2010

(54) SYSTEM AND METHOD FOR CRAWL POLICY MANAGEMENT UTILIZING IP ADDRESS AND IP ADDRESS RANGE

(75) Inventors: Varun Bhagwan, San Jose, CA (US); Rajesh M. Desai, San Jose, CA (US); Piyoosh Jalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 11/625,110

(22) Filed: Jan. 19, 2007

(65) Prior Publication Data

US 2008/0175243 A1     Jul. 24, 2008

(51) Int. Cl.
  *H04L 12/28* (2006.01)
  *H04L 12/56* (2006.01)
  *G06F 7/00* (2006.01)
  *G06F 17/30* (2006.01)
(52) U.S. Cl. .................. 370/392; 707/3; 370/389; 370/390
(58) Field of Classification Search .......... 370/392, 370/389, 390; 707/3
  See application file for complete search history.

(56) References Cited

U.S. PATENT DOCUMENTS

| 6,263,364 | B1 | 7/2001 | Najork et al. |
|---|---|---|---|
| 6,418,433 | B1 | 7/2002 | Chakrabarti et al. |
| 6,418,452 | B1 | 7/2002 | Kraft et al. |
| 7,231,405 | B2* | 6/2007 | Xia .................. 707/104.1 |
| 7,480,651 | B1* | 1/2009 | Matthiesen et al. .......... 707/3 |
| 2002/0061029 | A1* | 5/2002 | Dillon .................... 370/432 |
| 2003/0078035 | A1* | 4/2003 | Sheha et al. ............. 455/414 |
| 2003/0206554 | A1* | 11/2003 | Dillon .................... 370/432 |
| 2005/0086206 | A1* | 4/2005 | Balasubramanian et al. ... 707/3 |

FOREIGN PATENT DOCUMENTS

WO    WO2006058075    6/2006

OTHER PUBLICATIONS

Odysseas Papapetrou, George Samaras: IPMicra: Toward a Distributed and Adaptable Location Aware Web Crawler. ADBIS (Local Proceedings) 2004.*
"On the Move to Meaningful Internet Systems 2004; CoopIS, DOA, and ODBASE," Meersman et al., OTM Confederated International Conferences CoopIS, DOA, and ODBASE 2004, Agia Napa, Cyprus, Oct. 25-29, 2005 Proceedings, Part I, LNCS 3290, pp. 581-596, Springer-Verlag Berlin Heidelberg 2004.

(Continued)

*Primary Examiner*—Ayaz R Sheikh
*Assistant Examiner*—Tarell Hampton
(74) *Attorney, Agent, or Firm*—Cantor Colburn LLP; Leonard Guzman

(57) ABSTRACT

The present invention relates to a method for configuring a policy management protocol for a web crawler, the method further comprising the steps of determining a web space that is to be crawled by a web crawler, wherein the web space is comprised of an IP address and/or a range of IP addresses, and determining additional hostnames that are associated with the IP address and/ range of IP addresses. The method further comprises the steps of configuring the web crawler to crawl the IP address and/ range of IP addresses, and determine additional hostnames that are associated with the IP address or range of IP addresses, and performing a web crawling function upon the determined additional hostnames by the web crawler.

1 Claim, 2 Drawing Sheets

OTHER PUBLICATIONS

"Evaluation of Crawling Policies for a Web-Repository Crawler", McCown et al., HT'06, Aug. 22-25, 2006, Odense, Denmark, Copyright 2006 ACM 1-59593-417-0/06/0008, pp. 157-167.

"Aliasing on the World Wide Web: Prevalence and Performance Implications", Kelly et al., WWW2002, May 7-11, 2002, Honolulu, Hawaii, USA, ACM 1-58113-449-5/02/0005, pp. 281-292.

"Scalability, Fidelity, and Containment in the Potemkin Virtual Honeyfarm", Vrable et al., SOSP'05, Oct. 23-26, 2005, Brighton, United Kingdom, Copyright 2005 ACM 1-59593-079-5/05/0010, pp. 148-162.

"Stanford WebBase Components and Applications", Cho et al., ACM Transactions on Internet Technology, vol. 6, No. 2, May 2006, pp. 153-186.

* cited by examiner

SYSTEM AND METHOD FOR CRAWL POLICY MANAGEMENT UTILIZING IP ADDRESS AND IP ADDRESS RANGE

TRADEMARK

IBM® is registered trademark of International Business Machines Corporation, Armonk, N.Y., U.S.A. Other names used herein may be registered trademarks, trademarks or product name of International Business Machines Corporation or other companies.

BACKGROUND OF THE INVENTION

1. Field of the Invention

This invention relates to methodologies for distributed web crawling and, more particularly, to a web crawling system that uses IP address and IP address range to assist in the efficient downloading of websites that belong to an IP address and/or IP address range.

2. Description of Background

A crawler or a robot, is defined as a software component that continuously visits websites on the Internet, or an Intranet, and downloads web pages from the websites and stores them in a local repository for further analysis and data mining. There are many types of crawlers, wherein each category of crawler can be configured to carry out specific functions. For example, there are focused or topical crawlers, this category of crawler limit their crawling to sites belonging to specific taxonomies, or geological regions. The crawlers are configured with such limitations in order to ensure that the sites being crawled are relevant to an overall goal of the system. Focus and topical crawling is typically implemented by specifying a web space that is to be crawled. A web space is determined according to utilization need, and comprises a set of allow and forbid rules, the rules being used to control the set of sites and directories that a focus crawler is allowed to visit. Configuring the web space for a focus crawler is very critical, as these rules are used to ensure that the focus crawler crawls all the pages that have been determined to be of interest.

The continual growth of the sites on the Internet leads to an increasing amount of challenges when defining the web space for a focus crawler. Therefore, there exists a need for a methodology to improve the efficiency in determining a web space, and further in implementing policies that are directed to configuring focus crawlers to crawl the defined web spaces.

SUMMARY OF THE INVENTION

The shortcomings of the prior art are overcome and additional advantages are provided through the provision of a method for configuring a policy management protocol for a web crawler, the method further comprising the steps of determining a web space that is to be crawler, the method crawler, wherein the web space is comprised of at least one IP address and at least one range of IP addresses, storing at least one IP address and at least one range of IP addresses within a URL frontier, and determining additional hostnames that are associated with the at least one IP address by performing a reverse DNS lookup of the at least one IP address.

The method further comprises the steps of configuring the web crawler to crawl at least one IP address or at least one range of IP addresses, and determine the additional hostnames that are associated with at least one IP address or at least one range of IP addresses, and performing a web crawling function upon the determined at least one IP address, at least one range of IP addresses, and the determined additional hostnames by the web crawler.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other object, features, and advantages of the invention are apparent from the following detailed description taken in conjunction with the accompanying drawings in which:

Figure 1:
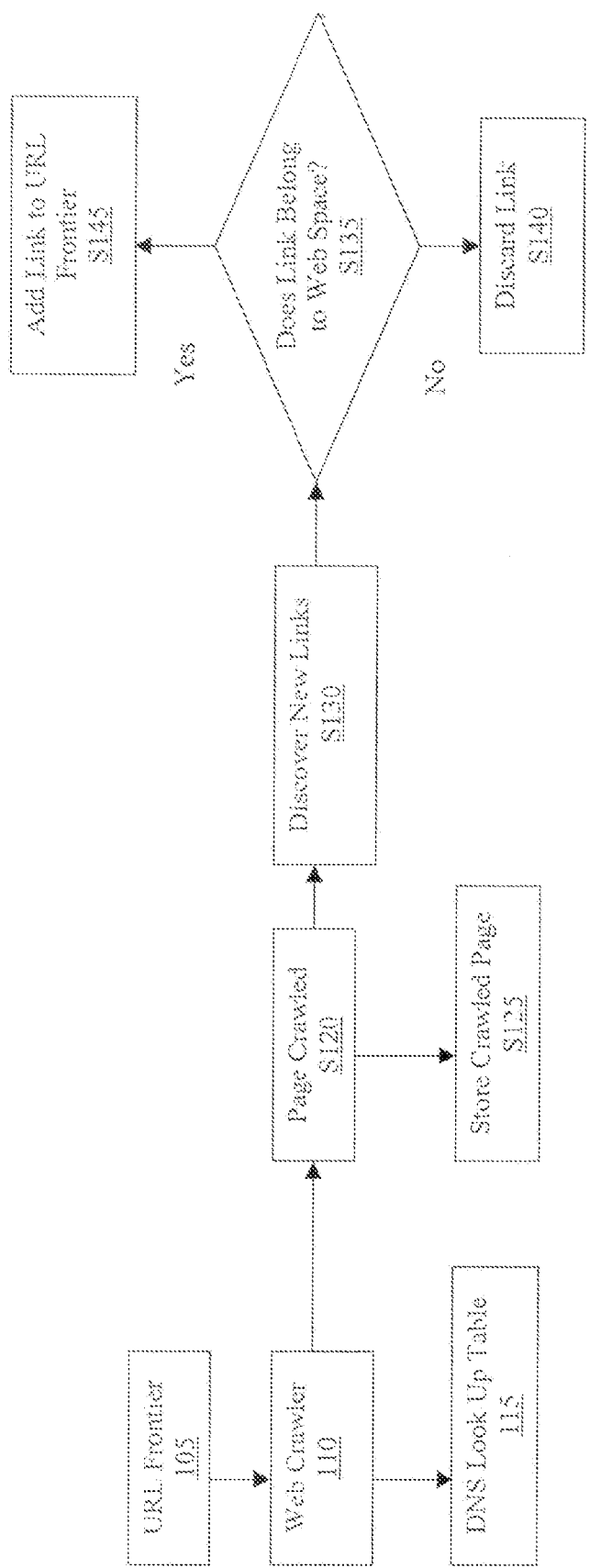
FIG. 1 illustrates a flow diagram of aspects one example of a web crawler system as implemented within an embodiment of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

A focus crawler is a crawler or robot that does a restrictive crawl of websites that are of interest to a crawler operator. A focus crawler can be configured to crawl a predetermined list of hostnames, directories, and IP addresses. Additionally, the focus crawler can be configured to not crawl a predetermined list of hostnames, directories, and IP addresses. This configuration list comprising the specified hostnames, directories, and IP addresses is called a web space.

Once initiated, a focus crawler makes an attempt to crawl all of the website pages that belongs to a web space. Typically, as configured within a focus crawler, a web space could comprise the following configuration instructions:

Allow domain www.ibm.com
Allow address 169.222.1.2
Allow range 169.222.0.0/15
Allow prefix http://www.news.com/business
Forbid prefix http://www.news.com/archive
Forbid address 168.1.2.3
Forbid range 167.212.0.0/14

Typically, focus crawlers are configured with the list of sites and directories they are eligible to crawl. This particular aspect restricts a focus crawler to host based crawling, since IP addresses are considered string-based hosts. If a focus crawler could be configured to crawl by IP address, or by IP address range, then it would be possible to implement enhanced crawler configurations (e.g., crawling types of sites as defined by the Regional Internet Registries (RIRs)). Moreover, new sites that are added that belong to an IP address, or a range of IP addresses, will automatically be picked up by the focus crawler that is configured to crawl the IP address or range of IP addresses.

Some RIRs, such as the Asia-Pacific Network Information Centre (APNIC) reserves particular IP address ranges for particular types of sites.

Examples of APNIC resources ranges include:
- 218.100.0.0/16 is used to make /24 assignments to Internet Exchange Points (IXPs).
- 203.119.0.0/16 is used to make /24 assignments to Critical Infrastructure.
- 169.208.0.0/15 is used to make /21 allocations for experimental purposes.
- 169.210.0.0/14 169.214.0.0/13 169.222.0.0/15 are used for conferences, exhibitions and temporary assignments.
- 196.192.0.0/13 is used to make /22 allocations to future members of the African Regional Registry (AfriNIC).

Referencing the above IP address resource ranges, if we were to crawl websites for conferences and exhibitions in the Asia-Pacific regions, then we would need to configure a focus crawler to crawl all of the hosts in the IP range 169.222.0.0/15. It must be noted that this notation of an IP address range is configured in accordance with the Classless Inter-Domain Routing (CIDR). Therefore, the IP address range 169.222.0.0/15 means that first 15 bits out of 32 bits IPv4 address are used to identify the unique network, thus leaving the remaining bits to be configured to identify a specific host. Another instance when crawling by IP address or IP address range is helpful is in the event that an organization is assigned a range of addresses by a RIR. In this instance, crawling pages that are related to the organization would be particularly helpful if the IP address/range could be specified for the organization, and a focus crawler configured to crawl all of the sites that are operated by the organization.

Another instance in which it would be beneficial to utilize IP address and/or IP address range based crawling is in the event that focused crawling of websites belonging to a geographic location, or region is necessitated. When a discovery focus crawler encounters a new IP address it sends the IP address to a geoIP service, the geoIP service thereafter determining the location of the IP address. Thus, the focus crawler could be configured to crawl the new IP address as determined by the geoIP service.

There is yet another aspect of employing IP addresses to crawling, which is related to the restrictions one can impose on the crawling process. The way this works is that a focus crawler user specifies a forbid rule in the web space, and configures the focus crawler not to crawl this restricted web space. Typically forbid rules comprise domain-names, directory names, and sometimes IP addresses.

However, on the pages in the Internet, IP addresses and domain names are sometimes used interchangeably in the hyperlinks. This creates a serious problem for focus crawlers when trying to apply such a hyperlink to the web space rules. For example, in the event that a user specifies that all sites from the domain name www.ibm.com (the registered domain name for IBM®) are to be blocked, but the hyperlink in question is of the type http://129.42.42.212/products/index.html (where 129.42.42.212 actually is the IP address for www.ibm.com), then the matching of the web space rules with this hyperlink will fail. This is in spite of the fact that the user desires to restrict any crawling of www.ibm.com.

By corollary, there could also be a situation where a user desires to block access to a set of IP addresses, but did not configure the blocking of the sites hosted on those IP addresses. This event would again result in a situation where the focus crawler would end up crawling undesired content. One can make similar cases for the allowable crawl sites in a web space, where a focus crawler would inadvertently not crawl a site it was configured to crawl, simple because the hyperlink in question contained the IP address, while the rules contained the site-name, or vice-versa.

Within aspects of the present invention, a focus crawler can be configured to crawl a web space based upon an IP address, or an IP address range. Within embodiments of the present invention, a focus crawler can be configured to crawl a web space based upon in accordance with the following configuration instructions:
Allow address 169.222.1.2
Allow range 169.222.0.0/15

The rule "Allow the IP address 169.222.1.2" is defined as meaning that all of the hosts that map to IP address 169.222.1.2 will be crawled. Further, the rule "Allow range 169.222.0.0/15" is defined as meaning that all of the hosts with IP addresses matching the first 15 bits of the IP address range, which happens to be the network part of the address.

Within aspects of the present invention a further technique can be employed to discover new hostnames that belong to an IP address and range of IP addresses. For each allowed IP address, and for each IP address in the range of allowed IP addresses, an HTTP GET request is transmitted to the IP address to in order to retrieve the default webpage. From the default webpage all of the discovered URLs that are comprised within the webpage are parsed. Thereafter, a DNS lookup operation is performed upon the parsed URLs in order to determine if the URLs fulfill the criteria of the prescribed web space. All of the URLs that are determined to fulfill the requirements for the web space are added to the URL frontier.

Turning now to the drawings in greater detail, it will be seen that in FIG. 1 there is a flowchart diagram illustrating aspects of an embodiment of the present invention. As seen in FIG. 1, a URL frontier 105 is established for the web focus crawler 110. The URL frontier 105 is implemented to configure the web focus crawler 110 with the web space information detailing web space that the web focus crawler 110 is allowed to crawl, and is restricted from crawling. A DNS lookup table 115 is implemented to assist the web focus crawler 110 in determining the host that belongs to an IP address, or IP address range. Within aspects of the present invention some of the hosts belonging to an IP address can be determined by doing a reverse DNS lookup. As part of the reverse DNS lookup function, aliases for these hosts could also be found, and added to the list of hosts for the IP address or IP address range. These hostnames could be added to the URL frontier 105, and thus configured within the web focus crawler 110 by an external or an internal utility.

At step 120, the web focus crawler 110 initiates a crawl operation. After a page has been crawled by the web focus crawler 110 the URL is checked against the web space to see if there is a match in the URL frontier 105. During a web space match first the URL is checked against the directory and host rules, if the URL does not pass then the IP address of the website is checked against the address and range rules to see if the page should be stored in the repository (step 125) for analysis, or it should be discarded. Further, at step 130, any links discovered at the website are further analyzed. A determination is made at step 135 as to if the discovered link belongs to the web space. In the event that the link is determined to belong to the web space is saved and added to the URL frontier 105 at step 145. In the event the link is determined not to belong to the web space, it is discarded (step 140).

Figure 2:
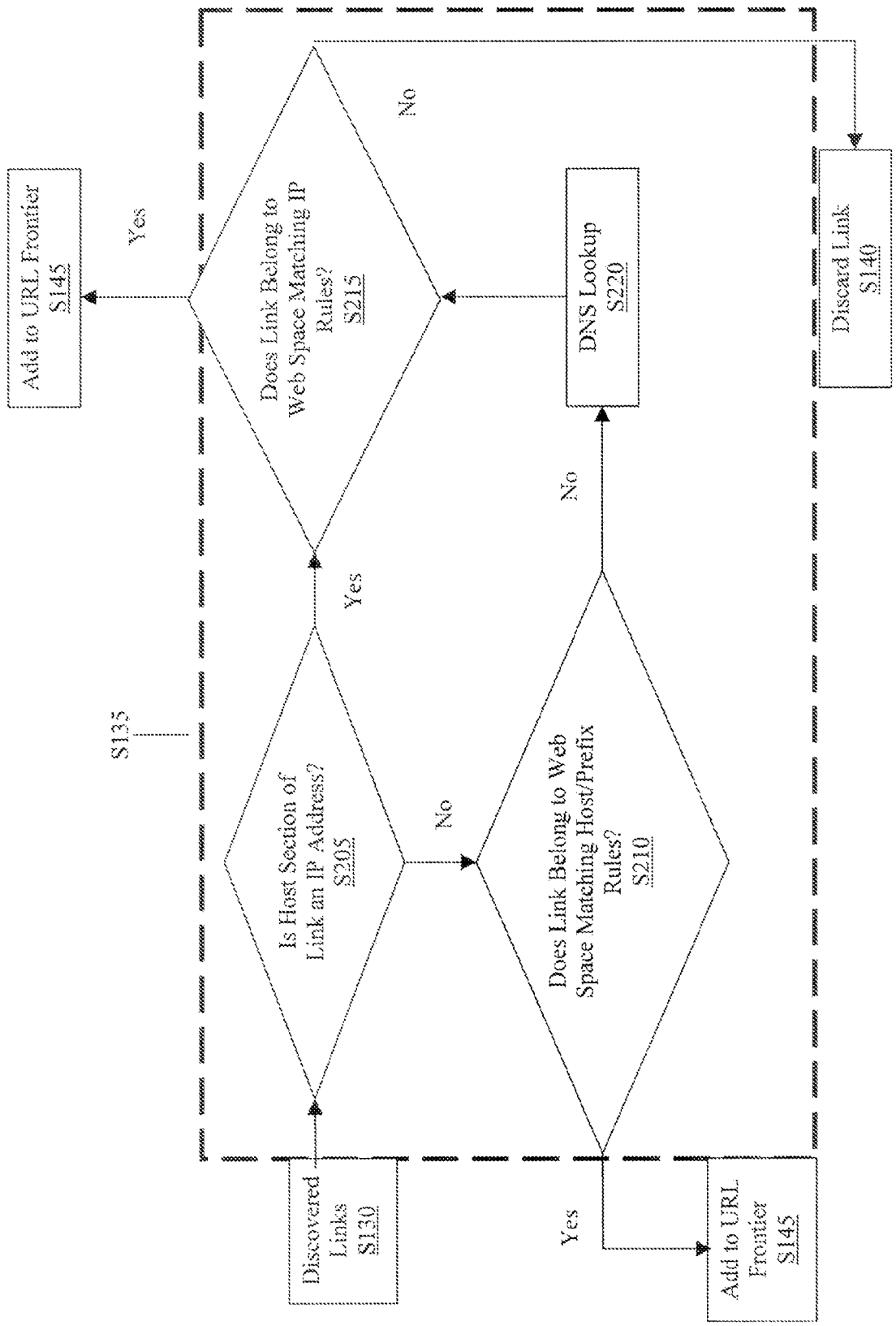
FIG. 2 illustrates a flow diagram detailing aspects of a URL verification process that can be implemented within embodiments of the present invention.

FIG. 2 shows the determination operation of step 135 in greater detail. We see in FIG. 2 that upon the discovery of a new URL link a determination is made as to whether the host identification segment of the discovered link is an IP address (step 205). If a determination is made that the host identification segment of the discovered link is an IP address, then at step 215 a further determination is made to ascertain if the IP address belongs to the web space in accordance with the prescribed rules of the web space. If the link is determined to fulfill the IP rule criteria for the web space, then the link is added to the URL frontier 105. If the link is determined not to fulfill the rule criteria for the web space, then it is discarded (step 140).

In the event at step 205 that the host identification segment for a discovered link is not part of an IP address, then at step 210 a determination is made as to whether the discovered link fulfills the criteria for host/prefix rules that have been established for the web space. If the discovered link fulfills the web space rule criteria, then it is added to the URL frontier 105. In the event that the link does not fulfill the rule criteria then at step 220 a DNS lookup operation is performed upon the discovered link to ascertain the an IP address, or IP address range to which the link belongs. Thereafter, the link is submitted to the determined operations of step 215.

Crawling by IP address and IP address range is beneficial in solving a variety of crawl policy problems. Some IP addresses and IP address ranges are earmarked for particular type of sites, or for certain geographical location. Specifying sites to be crawled by IP address or IP address range, hence directs the focus crawlers to crawl those sites without actually building a list of the relevant sites. Within further aspects of the present invention, a web focus crawler is configured to crawl the IP address of a specified Intranet site.

In summary, web crawling by IP address and IP address range makes it easier for an administrator to manage a web space as new websites are added to the Internet and/or an Intranet. If a user is interested in particular sites that always belong to an IP address, or IP address range, the IP addresses or IP address range will automatically be discovered and crawled by the focus crawler if the focus crawler is configured with the appropriate IP based rules.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagram depicted herein is just an example. There may be many variations to this diagram or the step (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A computer-implemented method for configuring a policy management protocol for a web crawler, a computer executing computer code to perform the method comprising:

determining a web space that is to be crawled by a web crawler, wherein the web space is comprised of at least one IP address and at least one range of IP addresses;

storing the at least one IP address and the at least one range of IP addresses within a URL frontier;

determining additional hostnames that are associated with the at least one IP address by performing a reverse DNS lookup of the at least one IP address;

configuring the web crawler to crawl the at least one IP address or at least one range of IP addresses, and determine additional hostnames that are associated with the at least one IP address or at least one range of IP addresses; and performing a web crawling function upon the determined the at least one IP address, the at least one range of IP addresses, and the determined additional hostnames by the web crawler;

wherein determining the web space further comprises determining at least one IP address and one range of IP addresses that the web crawler is restricted to crawling;

wherein the IP address and range of IP addresses are associated with geographic locations;

wherein the IP address and range of IP addresses are associated with a predetermined taxonomy as defined by a regional Internet registry;

wherein performing web crawling includes evaluating a link in a crawled website to determine if the link belongs to the web space, the evaluating including:

determining that the host identification segment of the link is an IP address and adding the link to the URL frontier if the link IP address matches the at least one IP address or at least one range of IP addresses of the web space;

determining that the host identification segment of the link is not an IP address and adding the link to the URL frontier if link fulfills host/prefix rules for the web space;

determining that the host identification segment of the link is not an IP address, determining that the link does not fulfill host/prefix rules for the web space; performing a DNS lookup operation to obtain an IP address for the link, and adding the link to the URL frontier if the link IP address matches the at least one IP address or at least one range of IP addresses of the web space.

* * * * *